(12) United States Patent
Coker

(10) Patent No.: US 8,015,214 B2
(45) Date of Patent: Sep. 6, 2011

(54) METHOD OF ENCAPSULATING INFORMATION IN A DATABASE AND AN ENCAPSULATED DATABASE

(75) Inventor: Christopher B. A. Coker, Annandale, VA (US)

(73) Assignee: Encapsa Technology, LLC, Wilmington, DE (US)

( * ) Notice: Subject to any disclaimer, the term of this patent is extended or adjusted under 35 U.S.C. 154(b) by 0 days.

(21) Appl. No.: 12/831,235

(22) Filed: Jul. 6, 2010

(65) Prior Publication Data

US 2010/0274788 A1 Oct. 28, 2010

Related U.S. Application Data

(63) Continuation-in-part of application No. 11/477,533, filed on Jun. 30, 2006, now Pat. No. 7,752,231.

(51) Int. Cl.
*G06F 17/30* (2006.01)
(52) U.S. Cl. ........................................ 707/802
(58) Field of Classification Search ................ None
See application file for complete search history.

(56) References Cited

U.S. PATENT DOCUMENTS

| | | | |
|---|---|---|---|
| 5,794,039 A * | 8/1998 | Guck | 1/1 |
| 2002/0083192 A1* | 6/2002 | Alisuag | 709/237 |
| 2003/0037248 A1* | 2/2003 | Launchbury et al. | 713/193 |
| 2006/0177065 A1* | 8/2006 | Halbert | 380/277 |
| 2007/0136345 A1* | 6/2007 | Blazejewski et al. | 707/101 |

* cited by examiner

*Primary Examiner* — Mohammad Ali
*Assistant Examiner* — Syed H Hasan
(74) *Attorney, Agent, or Firm* — Charter IP LLC; Matthew J. Lattig

(57) ABSTRACT

In a method of encapsulating information in a database, a message is partitioned into a plurality of object class entries within the database. An object class pointer is generated for each of a first subset of the plurality of object class entries, the generating further including executing a pointer key algorithm, the algorithm additionally generating a random number for each object class entry and concatenating the randomly generated numbers to form a single parameter string adapted to obfuscate a path between a pointer and its corresponding object class entry. The plurality of object class entries are stored in non-adjacent storage locations within the database, with each of a second subset of the plurality of object class entries stored in association with one of the generated pointers.

32 Claims, 10 Drawing Sheets

METHOD OF ENCAPSULATING INFORMATION IN A DATABASE AND AN ENCAPSULATED DATABASE

PRIORITY STATEMENT

This application is a continuation-in-part of and claims the benefit under 35 U.S.C. §120 to U.S. patent application Ser. No. 11/477,533 to the inventor, filed Jun. 30, 2006 now U.S. Pat. No. 7,752,231, the entire contents of which are hereby incorporated by reference herein.

BACKGROUND

1. Field

Example embodiments in general are directed to a method of encapsulating information in a database and to an encapsulated database for use in a communication system.

2. Related Art

Conventional databases configured to store user-associated information typically employ a proprietary "record" format. A record includes a number of fields which are uniform throughout a particular database. Records typically include (1) fields used to authenticate or identify users, and (2) fields used to store data associated with the users.

In an example, identifying fields may include a "First Name" field, a "Last Name Field", a "Social Security Number" field, etc., and/or any other well-known identification/authentication signature (e.g., a biometric signature of a user's fingerprint, retinal scan, etc.). In another example, data fields may include "Credit History", "Medical History", etc., and/or any other well type of user-associated data.

Databases using the same record fields can communicate with each other with a standardized communication interface protocol (CIP). For example, first and second Oracle databases may all include the same, or at least compatible, record field structures. The first and second Oracle databases may share information, stored in their respective record fields, using an Oracle-specific CIP because the record field structure of the first and second Oracle databases is known at each database.

However, different databases typically include proprietary record field structures with potentially incompatible CIPs. For example, a non-Oracle database cannot be accessed using the Oracle-specific CIP unless the non-Oracle database employs a "translator" application which converts the Oracle-specific CIP to the non-Oracle CIP, and vice versa. Translator applications are expensive to produce and maintain, and add complexity to inter-database communications. Further, it can be difficult to detect whether another database employs a translator application capable of communication with a source database, such that successful communication cannot be guaranteed.

Record fields are typically stored together in contiguous or adjacent memory address locations, such that identifying fields and data fields are in close, physical proximity to each other within conventional databases. Accordingly, if a conventional database is compromised by a hacker, the hacker can, with relative ease, combine the identifying fields with their associated data fields to obtain the relevance of the data fields.

Conventional techniques to reduce a hacker's success in extracting relevance from compromised data (e.g., by correctly associating compromised data with user-information) typically include adding layers of "active" encryption to database storage protocols. For example, an entire database, storing numerous records, may be encrypted such that the hacker cannot read any information from the database without obtaining a key to decrypt the database.

However, authorized users must also decrypt the database to access the information stored therein, which adds additional processing requirements and delays to database access. Further, if the hacker is able to successfully decrypt the database, the information present within the database becomes available to the hacker in the conventional "ready-to-read" format (e.g., contiguous/adjacent memory address record field storage). Also, if an authorized user loses the key required to decrypt the encrypted database, the authorized user cannot access the database until he/she obtains a replacement key, which can be a laborious process (e.g., requiring re-authentication and distribution of the replacement key).

SUMMARY

An example embodiment is directed to a method of encapsulating information in a database. In the method, a message is partitioned into a plurality of object class entries within the database. Each of the plurality of object class entries constitutes a portion of an object class from a plurality of object classes having a given hierarchy within the database. An object class pointer is generated for each of a first subset of the plurality of object class entries, the first subset including at least two object class entries therein. Each generated pointer points to a different one of the plurality of object class entries. The generating of the pointers further includes executing a pointer key algorithm, the algorithm additionally generating a random number for each object class entry and concatenating the randomly generated numbers to form a single parameter string adapted to obfuscate a path between a pointer and its corresponding object class entry. The plurality of object class entries are stored in non-adjacent storage locations within the database, with each of a second subset of the plurality of object class entries stored in association with one of the generated pointers. The second subset is different from the first subset and includes at least two object class entries therein.

Another example embodiment is directed to an encapsulated database for use in a communication system. The database includes a plurality of object class entries corresponding to given fields in a received message received from a given communication entity in the system, the message having been partitioned so that fields are dedicated to corresponding object class entries. Each object class entry constitutes a portion of a given object class of a plurality of object classes having a given object class hierarchy. The database includes a plurality of pointers, each for pointing to a different one of a first subset of the object class entries. The first subset includes at least two object class entries therein, each pointer generated by a pointer key algorithm which additionally generates a random number for each object class entry and concatenates the randomly generated numbers to form a single parameter string adapted to obfuscate a path between a given pointer and its corresponding object class entry. The database includes a plurality of storage locations, in which each of the plurality of object class entries corresponding to the fields of the message are stored in non-adjacent storage locations, with each of a second subset of the object class entries stored in association with one of the plurality of pointers such that each pointer points to a higher-level object class entry, as determined by the object class hierarchy, than the object class entry stored in association with each respective pointer. The second subset is different than the first subset and includes at least two object class entries therein.

Another example embodiment is directed to a method of organizing medical records from a plurality of disparate databases to retrieve common information there from. In the method, each medical record is partitioned into a plurality of data fields within a central database, each of the plurality of data fields constituting a portion of a data field class from a plurality of data field classes having a given hierarchy within the central database. A pointer is generated for each of a first subset of the plurality of data fields, the first subset including at least two data fields therein, each generated pointer pointing to a different one of the plurality of data fields. The generating of pointers further includes executing a pointer key algorithm, the algorithm additionally generating a random number for each data field and concatenating the randomly generated numbers to form a single parameter string adapted to obfuscate a path between a pointer and its corresponding data field. The plurality of data fields are stored in non-adjacent storage locations within the central database, with each of a second subset of the data fields stored in association with one of the generated pointers, the second subset being different from the first subset and including at least two data fields therein.

Another example embodiment is directed to a method of encapsulating information over a mobile communication device. In the method, a message received by the device is partitioned into a plurality of object class entries within a database, each of the plurality of object class entries constituting a portion of an object class from a plurality of object classes having a given hierarchy within the database. An object class pointer is generated for each of a first subset of the plurality of object class entries, the first subset including at least two object class entries therein, each generated pointer pointing to a different one of the plurality of object class entries. The generating of pointers further includes executing a pointer key algorithm, the algorithm additionally generating a random number for each object class entry and concatenating the randomly generated numbers to form a single parameter string adapted to obfuscate a path between a pointer and its corresponding object class entry. The plurality of object class entries are stored in non-adjacent storage locations within one of the database and device, with each of a second subset of the plurality of object class entries stored in association with one of the generated pointers, the second subset being different from the first subset and including at least two object class entries therein.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limitative of the example embodiments herein.

DETAILED DESCRIPTION

In order to better understand the example embodiments, an example communication system will be described, followed by examples of encapsulated databases and encapsulated database data mediation operations performed within the example system. Then, more detailed data mediation operations, including instant messaging between users, will be described in greater detail.

Example System

As discussed in the Background, conventional databases typically store user records in contiguous or adjacent memory address locations. An example embodiment herein is directed to an "encapsulated" database, which is characterized by non-contiguous or disparate storage of information such as user records or messages into "object classes". Terminology used to describe the encapsulated database throughout the remainder of this application is defined as follows.

"Object Class"—An object class is one of a plurality of defined, hierarchical fields stored within the encapsulated database. As described herein, object classes include, in an order from highest-level to lowest-level within an object class hierarchy, the object classes Folder, Form, Topic and Data. A "data field" can be a portion of an object class entry or in some cases all of an object class entry. Additionally, a data field class may occasionally be used synonymously with object class may be is one of a plurality of defined, hierarchical data fields stored within the encapsulated database. Where used hereafter, encapsulated database may occasionally be referred to as a central database solely for purposes of clarity.

"Pointer"—A pointer is a link to a destination memory address. In an example, the pointer may be an actual, physical memory address. In another example, the pointer may be encoded with a key or algorithm ("key algorithm"), such that the key or algorithm is required to extract a physical memory address based at least in part on the pointer.

Figure 1:
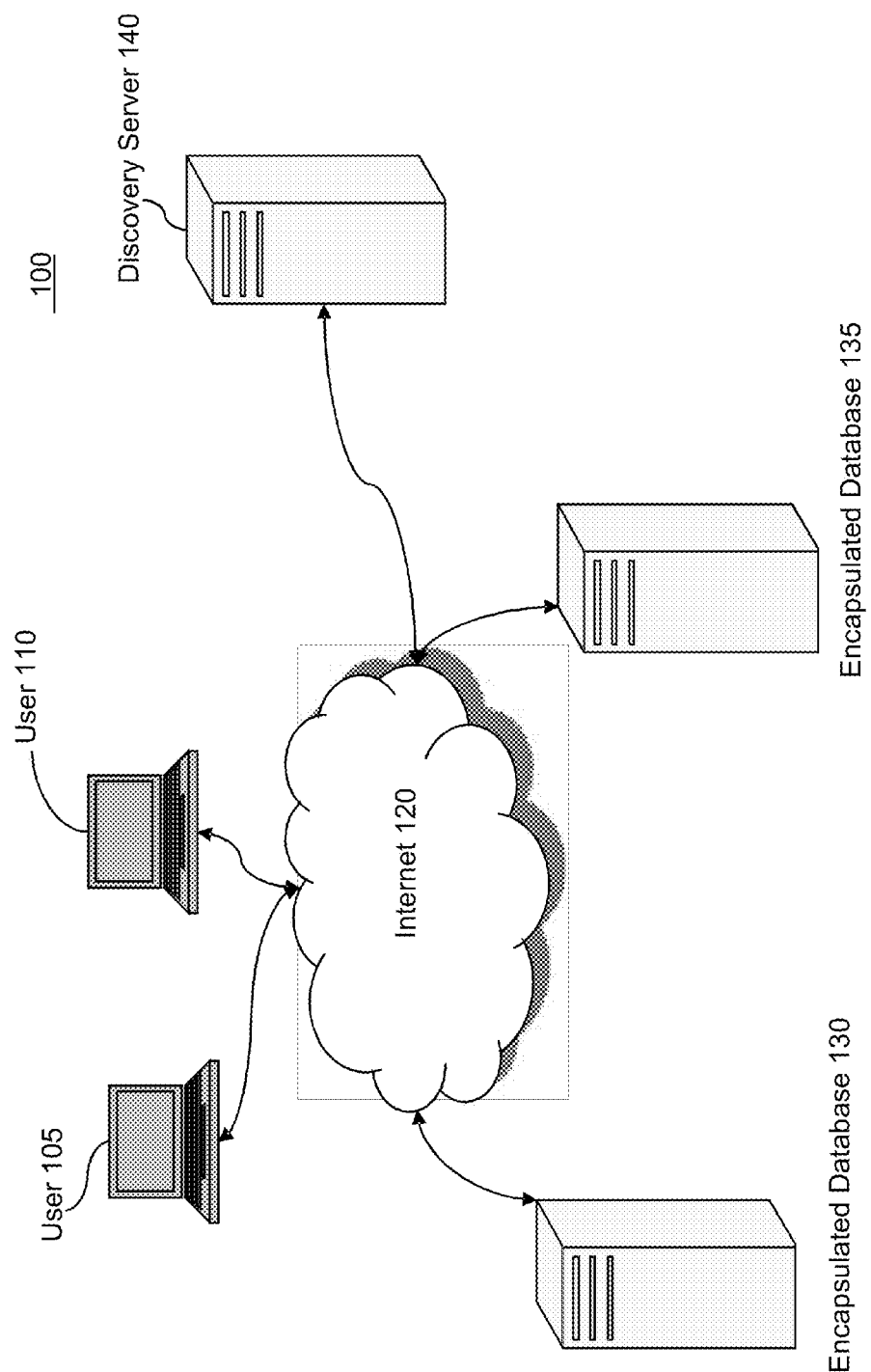
FIG. 1 illustrates a system according to an example embodiment.

FIG. 1 illustrates a system 100 according to an example embodiment. In FIG. 1, the system 100 includes users 105 and 110, an Internet 120, encapsulated databases 130 and 135 and a discovery server 140. Each of the users 105 and 110, the encapsulated databases 130 and 135 and the discovery server 140 are connected, and may access each other, through the Internet 120. In an example, the users 105 and 110 may be embodied as any well-known type communication device, such as a desktop computer, a notebook computer or laptop, a personal digital assistant (PDA), a mobile phone, etc. Alternatively, a user 105 or 110 may be a mobile communication device such as a tablet personal computer, RFID device, laser-based communication device, LED-based communication device, mobile navigation system, mobile entertainment system, mobile information system, mobile writing system, text messaging system, etc.

In another example, the encapsulated databases 130/135 and the discovery server 140 may each be embodied as any type of storage server, such as an Oracle server, a mainframe computer, or a notebook/desktop computer configured to operate as a storage server. The discovery server 140 maintains a set of user "locations", or encapsulated database associations, for all users 105/110 "logged on" to one of the encapsulated database servers 130/135 and/or having an account maintained by one of the encapsulated database servers 130/135 (e.g., even if logged off).

In a further example, the encapsulated databases 130/135 (sometimes referred to as a central database) and/or the discovery server 140 may be part of the user 105/110 infrastructure (hardware and/or software/firmware), or simply connected to users 105/110 as described above. The encapsulated databases 130/135 (and/or discovery server 140) may be stored on but not connectively integrated with one or both of users 105/110. Additionally in another example the encapsulated databases 130/135 and/or discovery server 140 may be generated and/or hosted by the users 105/110. In a further example, the encapsulated databases 130/135 and/or discovery server 140 may be adapted to be transmitted, transferred, transformed and/or translated by one or both users 105/110. OK Example embodiments of encapsulated databases and encapsulated database operations shall be hereinafter described with reference to the example system 100 of FIG. 1.

Building an Encapsulated Database

Figure 2:
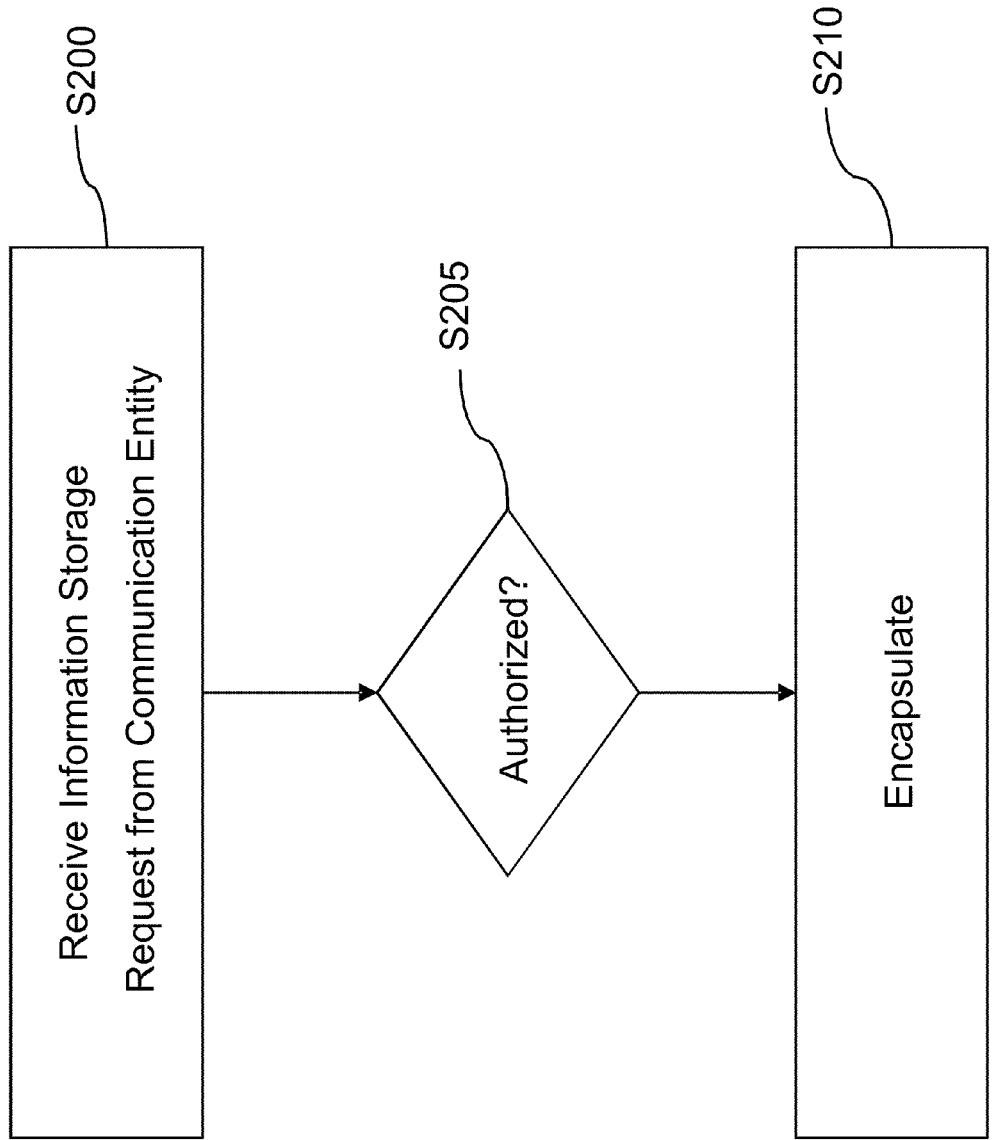
FIG. 2 illustrates a process for storing information within an encapsulated database according to an example embodiment.

An example of "building" or uploading information to an encapsulated database (e.g., the encapsulated database 130) will now be described with reference to the system 100 of FIG. 1. FIG. 2 illustrates a process for storing information within the encapsulated database 130 according to an example embodiment.

In the example embodiment of FIG. 2, the encapsulated database 130 receives a request to store information ("information storage request") at S200. In an example, the information for which storage is requested within the encapsulated database 130 is included along with the request received at S200. In this example, the communication entity may be any device capable of accessing the encapsulated database 130, either directly or indirectly. For example, the communication entity may be the user 105 sending the information storage request through the Internet 120.

At S205, the encapsulated database 130 evaluates the communication entity and the information storage request to determine whether the communication entity is authorized to modify the object classes designated within the information storage request, so as to store the information in the message at the requested location within the encapsulated database 130. This authorization determination at S205 may include several steps or functions, as illustrated in FIG. 3.

Figure 3:
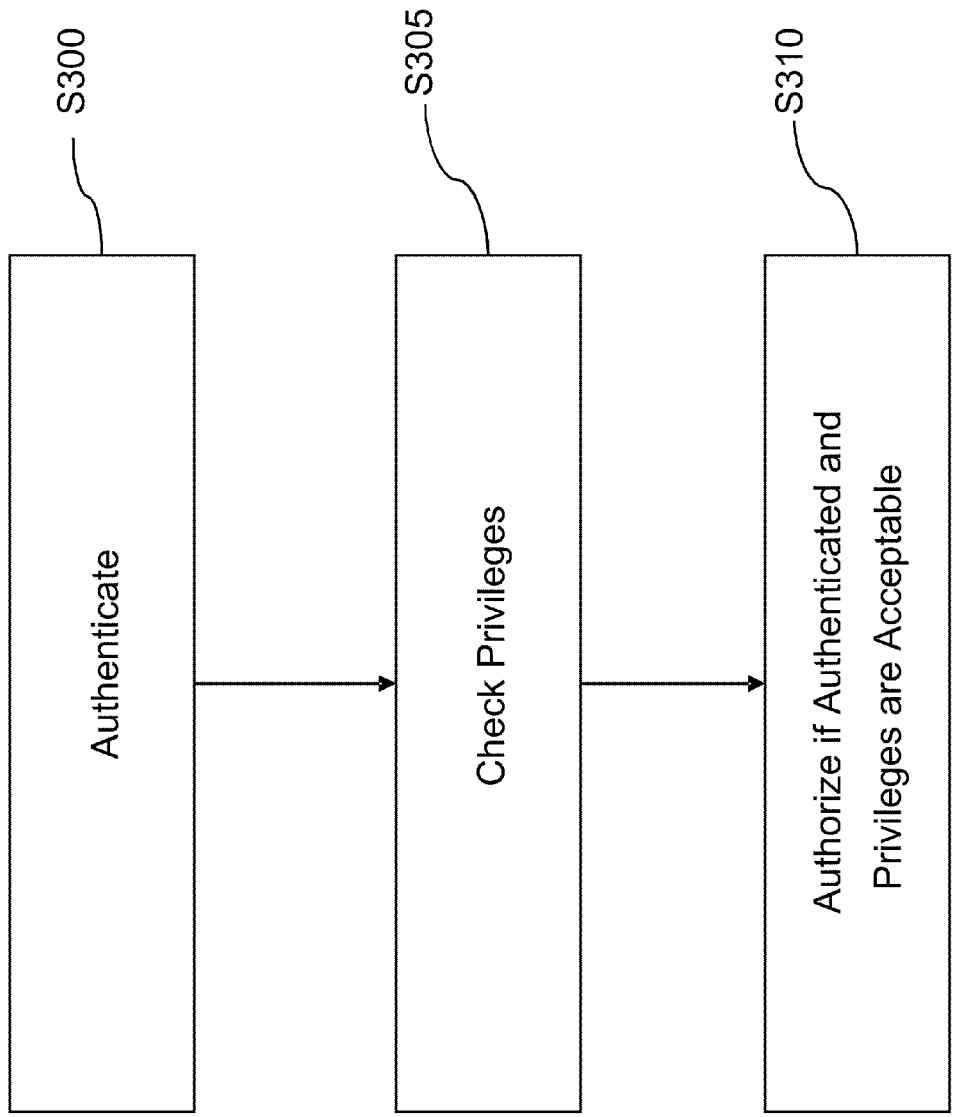
FIG. 3 illustrates a user authorization step according to another example embodiment.

FIG. 3 illustrates the authorization step or function S205 of FIG. 2 in greater detail according to another example embodiment. In FIG. 3, the communication entity authenticates itself with the encapsulated database 130 at S300. Any well-known authentication process may be employed by the encapsulated database 130 to authenticate the communication entity at S300. For example, at S300, the communication entity may be prompted to enter a password. In another example, the communication entity may be required to provide a digital certificate (e.g., obtained via a Diffie-Hellman key exchange) to authenticate itself. Alternatively, the authentication at S300 may be skipped if the communication entity has recently provided suitable authentication (e.g., the communication entity has already "logged on"). In an example, assuming password authentication, the communication entity may only be asked to re-authenticate itself at S300 after a given time period from a previous, acceptable authentication (e.g., 30 minutes, 60 minutes, a day, etc.).

At S305 of FIG. 3, the encapsulated database 130 compares the privilege level of the communication entity with the information storage request (from S200) to determine whether the communication entity has sufficient privileges to store the information at the requested location. The privilege level of the communication entity is maintained locally at the encapsulated database 130. For example, if the information storage request is an Instant Message (IM) from user 105 to user 110, the user 105 has adequate privileges to send the IM to user 110 if user 105 is present on an "Approved Sender's List" for user 110. In an example, employees within the same company, or the same team or division within a company, may automatically be approved for communication with each other. In another example, the user 110 may manually add user 105 to the "Approved Sender's List" to grant communication or storage privileges to user 105.

At S310 of FIG. 3, the encapsulated database determines whether to approve the information storage request (from S200) based on the results of steps or functions S300 and S305. Step or function S310 approves or authorizes the information storage request if (1) S300 authenticates the communication entity and (2) S305 determines that the communication entity has sufficient privileges to store information in the requested storage location; otherwise, the information storage request is not authorized.

Returning to S205 of FIG. 2, if the communication entity is not authorized to execute the information storage request (e.g., as determined from the process of FIG. 3), the information storage request is ignored and no action is taken by the encapsulated database 130 (e.g., other than, possibly, informing the communication entity that the information storage request has been denied). Otherwise, if the communication entity is determined to be authorized in S205, the process advances to S210. At S210, the information sent by the communication entity for storage within the encapsulated database 130 is "encapsulated", which will now be described in greater detail with respect to FIG. 4.

Figure 4:
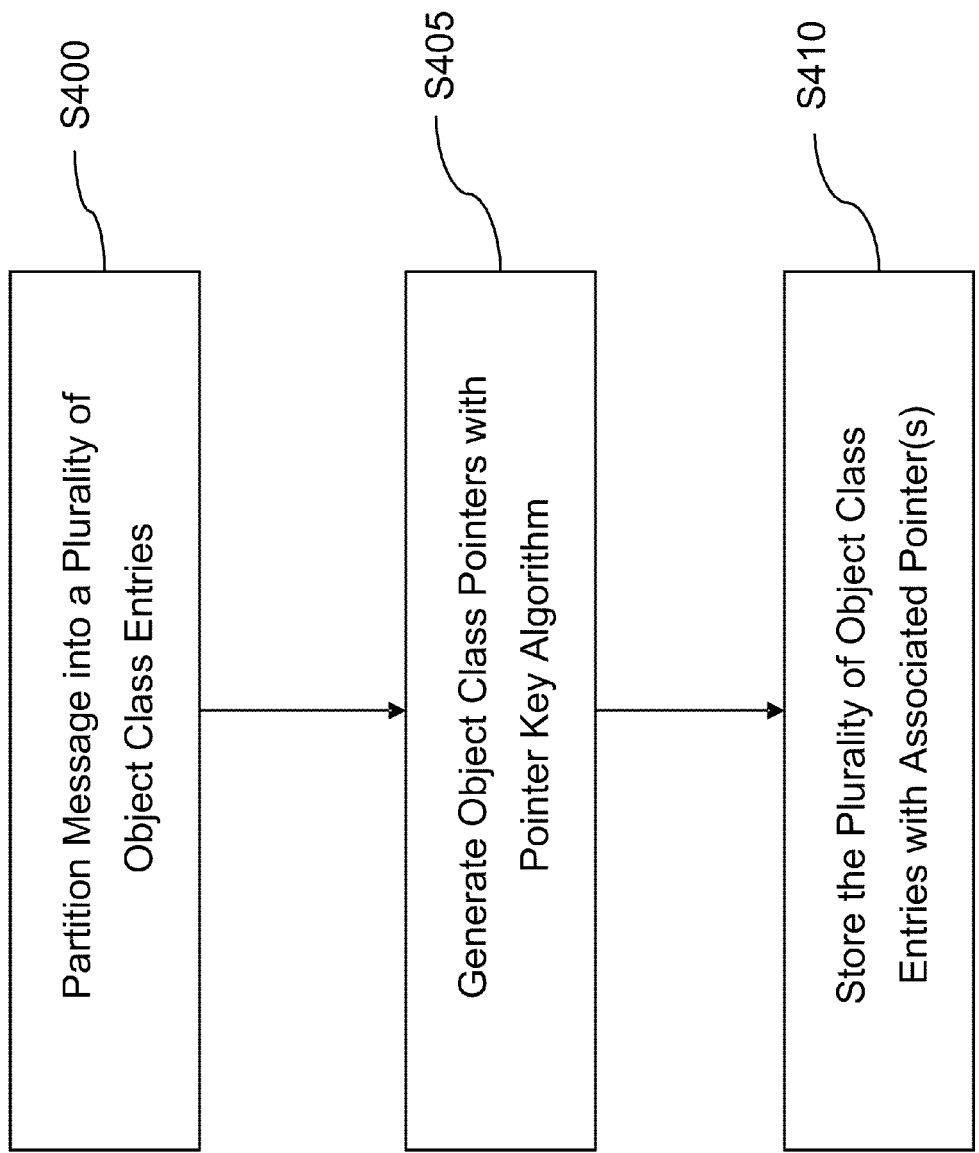
FIG. 4 illustrates a process of encapsulating information within an encapsulated database according to another example embodiment.

FIG. 4 illustrates a process of encapsulating information within the encapsulated database 130 according to another example embodiment. In FIG. 4, at S400, the information storage request is partitioned into four (4) hierarchical object classes. While example embodiments are hereinafter described as being directed to encapsulated databases configured for storing four object classes, it will be readily apparent that other example embodiments herein may include any number of object classes. As discussed above, the four object classes, arranged from a highest position in the object class hierarchy to a lowest position in the object class hierarchy, are "Folder", "Form", "Topic" and "Data".

In an example, if the information storage request (from S300) is an Instant Message (IM) from Mike Rogers to Joe Smith, each working in an Accounting department in company X (which maintains the encapsulated database 130), including the message contents ("I am going to be 30 minutes late to the meeting"), the message is partitioned as shown in Table 1 (Below).

TABLE 1

| Object Class | Object Class Entry (Contents) |
| --- | --- |
| Folder | Company X: Accounting Dept. |
| Form | Joe Smith |
| Topic | Instant Message |
| Data | Mike Rogers: "I am going to be 30 minutes late to the meeting" |

It is appreciated that Table 1 illustrates a simplification of actual values stored in the object classes Folder, Form, Topic and Data. For example, the object class Data may further store a time stamp indicating a time that the Instant Message from Mike Rogers was received at the encapsulated database 130 in step S200 of FIG. 2, and/or other data fields. In another example, the Instant Message may be appended to a previous series of Instant Messages between Mike Rogers and Joe Smith, referred to as a "Conversation". Also, while not shown in Table 1, each of the entries within object classes Folder, Form, Topic and Data are stored with associated pointers, which will now be described in greater detail.

Accordingly, at S405, the encapsulated database 130 executes a pointer key algorithm to generate object class identifications, or pointers, which are stored in association with the Form, Topic and Data object classes. Each pointer is used to identify an associated, higher-level object class. Accordingly, in an example, a topic pointer, a form pointer and a folder pointer are generated. The topic pointer is stored in association with a data entry in the Data object class, the form pointer is stored in association with a topic entry in the Topic object class and a folder pointer is stored in association with a form entry in the Form object class.

In an example, the pointers generated at S405 may be actual, physical addresses of the object class entries to which they point. Alternatively, in another example, the pointers generated at S405 may be a variable which, through another execution of the pointer key algorithm, may be converted into the actual, physical address of the object class entries. By "encoding" the pointers in this manner, it will be appreciated that a hacker having access to the physical contents of the encapsulated database 130 is not able to simply access an object class Data entry and find the associated higher-level object classes (e.g., topic, form, folder, etc.) without the pointer key algorithm.

A detailed example will now be given describing the above pointer generation of S405 of FIG. 4. The example provided below assumes a simplistic pointer key algorithm for the sake of facilitating understanding of the example embodiments of herein. However, it is understood that more complex pointer key algorithms may be employed in other example embodiments.

In the example pointer key algorithm, the pointers pointing to each of the topic, form and folder object class entries may be derived with the following Equation:

$$\text{Pointer} = [\text{Physical Address of Object Class Entry}] * 2 - 1 \quad \text{(Equation 1)}$$

As shown in Equation 1, the pointer key algorithm may be as simple as multiplying the physical address of the object class entry by 2 and then subtracting 1. An example execution of the pointer key algorithm will now be provided with respect to the example partitioned Instant Message of Table 1 (above). Assume that the object class Topic (e.g., "Instant Message"), Form (e.g., "Joe Smith") and Folder (e.g., "Accounting Dept.) entries of Table 1 already exist at physical addresses 46, 98 and 112, respectively (e.g., typical memory addresses will be higher and in a different and more complex format, but simplistic numbers are again used here for ease of description). The physical address at which the object class data entry is stored is not generated by the pointer key algorithm, but rather is simply a next available address in a queue reserved for object class data entries. The encapsulated database 130 maintains the next available address, and this address is assumed to be 144 for example purposes.

Applying the pointer key algorithm of Equation 1, the Topic object class entry pointer becomes 91, the Form object class entry pointer becomes 195 and the Folder object class entry pointer becomes 223 Once the pointers are obtained, Table 1 (above) may be expanded as shown below in Table 2.

TABLE 2

| | Object Class Entry | | | |
| --- | --- | --- | --- | --- |
| Object Class | Contents | Stored Pointer | Object Class ID | Physical Address |
| Folder | Company X: Accounting Dept. | N/A | 223 | 112 |
| Form | Joe Smith | 223 | 195 | 98 |
| Topic | Instant Message | 195 | 91 | 46 |
| Data | Mike Rogers: "I am going to be 30 minutes late to the meeting" | 91 | N/A | 144 |

As shown in Table 2 (above), the pointers and object class entry identifications (IDs) are stored for the object classes Form and Topic, but not object classes Data and Folder. The object class Data includes a pointer to the object class topic entry only because of the hierarchical object class arrangement. The "one-way" string of pointers provides security such that a hacker cannot simply access a higher-level object class (e.g., folder, topic, form, etc.) and advance to associated lower-level object classes. Likewise, the object class Folder does not include a pointer because it is the highest-level object class, and as such there is no higher-level object class in which to point.

Also, while not shown in Table 2, it is understood that any lower-level object class entry (e.g., Form, Topic, Data, etc.) may include pointers to more than one higher-level object class entry (e.g., Folder, Form, Topic, etc.). For example, the object class Data entry shown in Table 2 may further include pointers to each of the object class Form and Folder entries, and as such is not necessarily limited to only storing the next-highest level object class Topic pointer.

It has been previously noted that an object class is one of a plurality of defined, hierarchical fields stored within the encapsulated database. In order to prevent attack by reverse engineering means, the pathways of paths between the generated pointers and the object class entries or hence fields that these pointers point to are obscured or obfuscated by non-invasive, non hard encryption mechanisms.

In general, as part of step or function S405 in generating the pointers, the pointer key algorithm additionally generates a random number for each object class entry. The pointer key algorithm then concatenates the randomly generated numbers to form a single parameter string. This parameter string is designed to obfuscate a path between a pointer and its corresponding object class entry. In other words, it provides a rather simple obfuscation of the path of the hierarchical structure of the object classes.

For example, an object class structure is essentially flattened out and each field or field name (object class entry) is assigned a random number that is generated by a random number generator that is part of the standard algorithm in the code of the pointer key algorithm. In other words, each element in the hierarchy is assigned a random number. These random numbers are then joined up, or concatenated, in one string (parameter string), where each string represents a pointer to the element (one data, filed name, object class entry, etc) in the hierarchy. This prevents a reverse attack by reverse engineering or tracing back through the hierarchical structure. This can further be done simply, using a random number generating algorithm; hence, no hard encryption software is required.

Returning to FIG. 4, at S410, the object class entries for object classes Data/Topic/Form/Folder are stored in their respective, assigned physical addresses (e.g., 46, 98, 112, 144, etc.) within the encapsulated database 130 along with their associated higher-level object class pointers.

In an example, the stored plurality of object class entries within encapsulated database 135 (and/or 140) may be configured as encapsulated data of an extractable or exportable file. An example file may be a .csv file, although any other file format configurable for export or extraction is envisioned in accordance with the example embodiments.

Moreover, the encapsulated data stored in encapsulated database 135 (and/or 140), which originally was data encapsulated from two or more disparate databases (or data files) can be considered merged when a search is limited to selected tables within an encapsulated database.

Subsequently, each encapsulated table retains an identity within an encapsulated database. The merged data thus is embodied or represented by the stored plurality of object class entries, and can be merged or configured into an extractable or exportable file as noted above.

Accordingly, this merge feature can be understood further in more detail as follows. The stored plurality of object class entries may be further defined as an encapsulated, merged data set adapted to be filtered based on at least one of a common word, phrase and term of selected tables within an encapsulated database. The example encapsulation method may thus further entail searching for data in fields common to selected (disparate, original) tables, aligning data in successive rows by all common fields, and then saving those results from the searching and aligning functions as a new file of encapsulated data which may be adapted for extracted or export as previously set forth above and now further described below.

Retrieving Information from an Encapsulated Database

Figure 5:
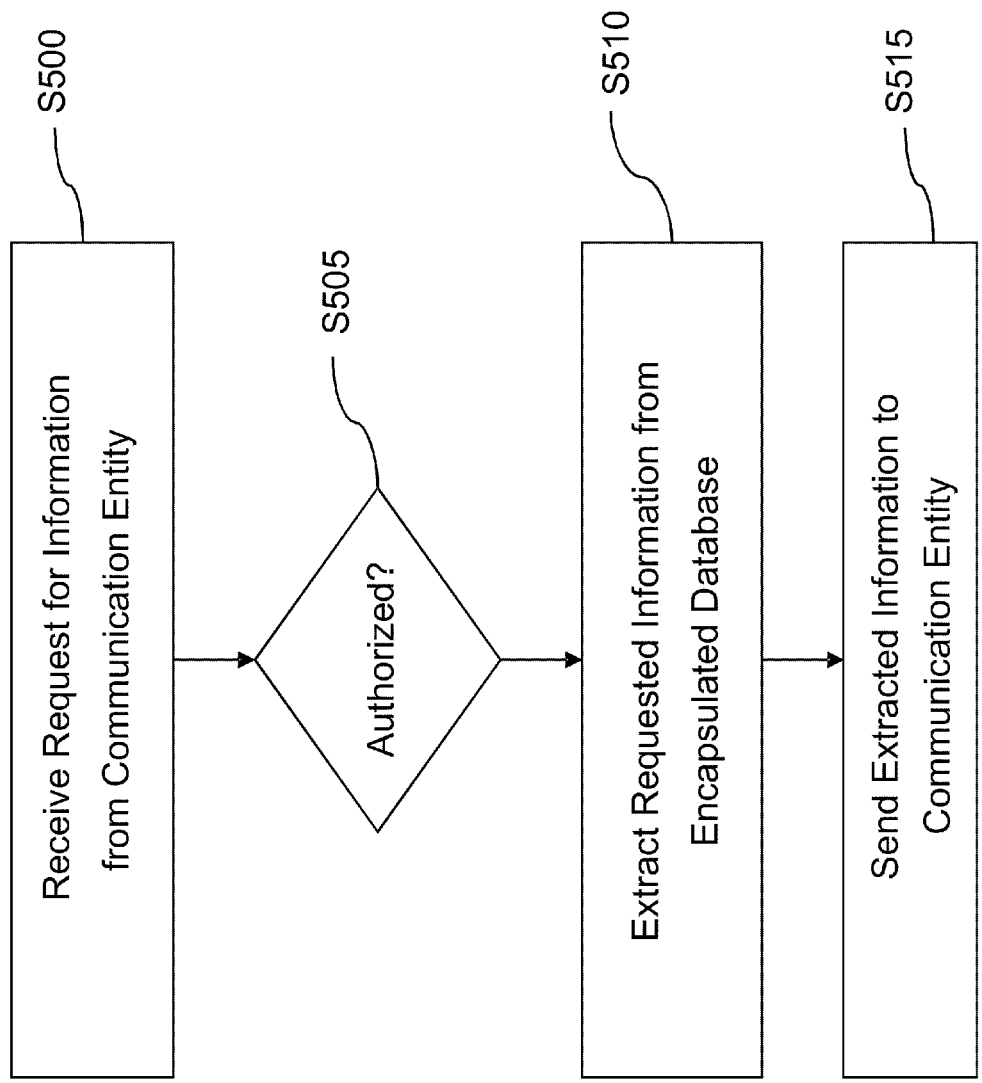
FIG. 5 illustrates a process for downloading information from the encapsulated database according to an example embodiment.

An example of retrieving or downloading information stored in the encapsulated database 130 will now be described with reference to the system 100 of FIG. 1. FIG. 5 illustrates a process for downloading information from the encapsulated database 130 according to an example embodiment.

In FIG. 5, at S500, the encapsulated database 130 receives a request for information from a communication entity (e.g., users 105/110, encapsulated database 135, etc.). Table 3 (below) illustrates an example set of possible information requests; it being understood that these are only a small subset of many other possible requests.

TABLE 3

| Request # | Information Request |
|---|---|
| 1 | If (First Name = "John") AND (Last Name = "Jones") THEN Return ALL; |
| 2 | If (Last Name = "Smith") OR (Last Name = "Jones") THEN LIST First Name, Last Name and Phone Number; |

TABLE 3-continued

| Request # | Information Request |
|---|---|
| 3 | If (Last Name = "Smith") OR (Last Name = "Jones") THEN LIST Instant Message History; |

Table 3 (above) will be discussed in greater detail later with reference to step S510 and the process of FIG. 6. At S505 of FIG. 5, the encapsulated database 130 evaluates the communicate entity and the request for information (from S500) to determine whether the communication entity is authorized to access the object classes designated within the request for information. In an example, S505 may be the performed in the same manner as S205 of FIG. 2, which is described with respect to the authorization determination process of FIG. 3. However, communication entities do not necessarily have the same "read" or "download" privileges as "write" or "upload" privileges.

For example, in most conventional database mediation systems, fewer users are granted privileges to write information than are granted privileges to read information, for security purposes. Accordingly, while S505 is performed in the same manner as S205 of FIG. 2, the results of the privilege check at S305 of FIG. 3 are not necessarily the same.

At S505, if the communication entity is not authorized to access the requested information (e.g., as determined from the process of FIG. 3), the request for information (from S500) is ignored and no action is taken by the encapsulated database 130 (e.g., other than, possibly, informing the communication entity that the request for information has been denied). Otherwise, if the communication entity is determined to be authorized at S505, the process advances to S510. At S510, the requested information is extracted from the encapsulated database 130, which will now be described in greater detail with respect to FIG. 6.

Figure 6:
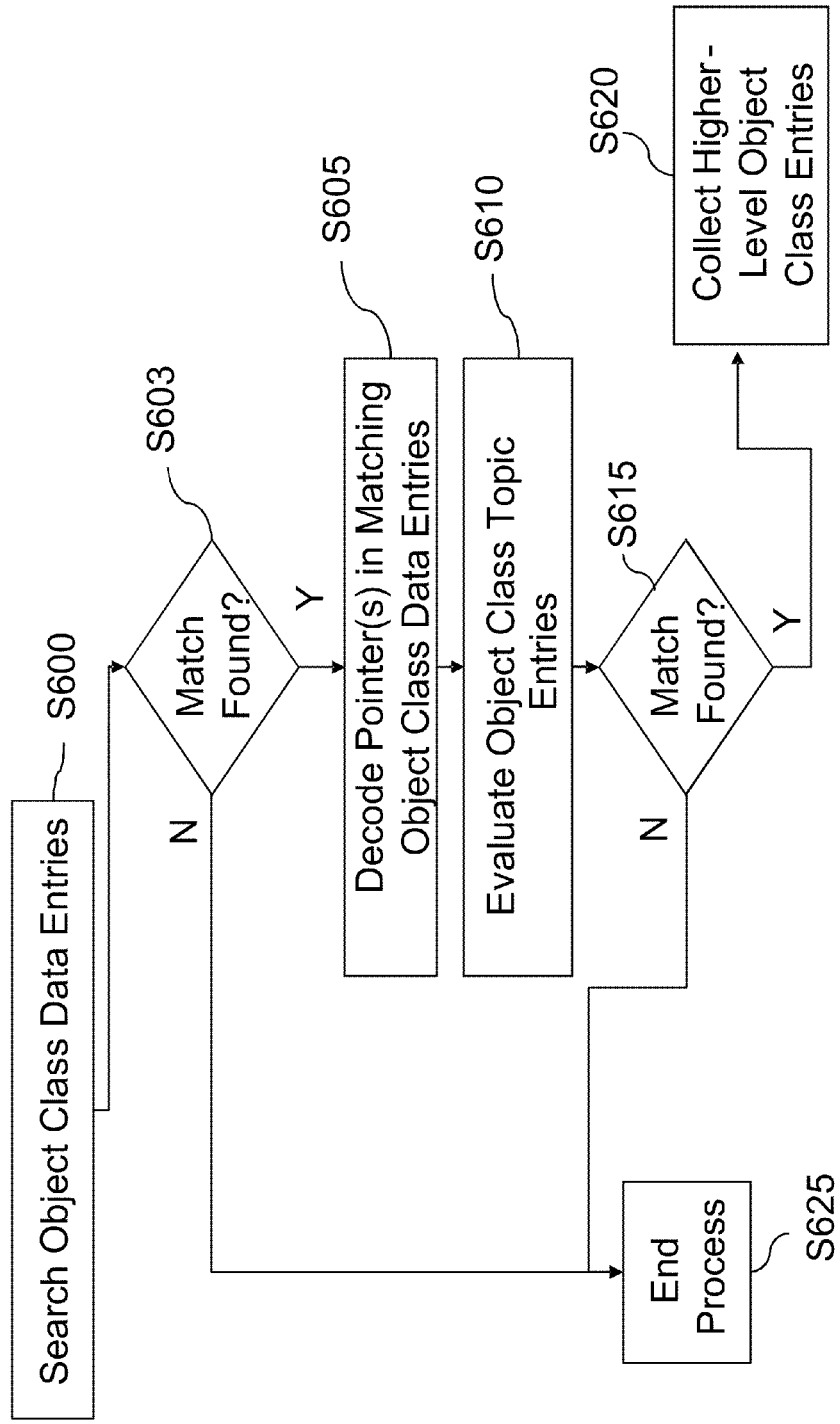
FIG. 6 illustrates a process of extracting information from the encapsulated database according to another example embodiment.

FIG. 6 illustrates a process of extracting information from the encapsulated database 130 according to another example embodiment herein. Referring to FIG. 6, at S600 the encapsulated database 130 searches all locally stored object class data entries (e.g., stored within the encapsulated database 130) for data fields (e.g., portions of the object class data entries) matching the information request (from S500). At S603, the encapsulated database 130 evaluates the results of the searching step S600. If the searching step S600 attains a subset of object class Data entries with one or more data fields matching the search criteria, the process advances to S605. Otherwise, if the searching step S600 finds no matches, the process of FIG. 6 terminates at S625.

At S605 of FIG. 6, the encapsulated database 130 decodes the object class topic pointers stored within each of the object class Data entries of the subset attain in step S600. At S610, the encapsulated database 130 evaluates the object class topic entries pointed to by the decoded object class topic pointers (from S605). At S615, the encapsulated database 130 determines whether one or more of the object class topic entries (S610) match one or more topics designated in the information request (from S500). If no matches are found, the process terminates at S625; otherwise, the process advances to S620. At S620, the encapsulated database decodes pointers to all remaining higher-level object class entries pointed to by the matching object class Topic entries.

Returning to the example embodiment of FIG. 5, at S515 the encapsulated database 130 sends the extracted information (from S510) to the communication entity. The extracted information includes all object class entries associated with the matching object class Topic entries of S615 (e.g., including the object class Data entries (from S603) pointing to the matching object class Topic entries, the matching object class Topic entries (from S615) and the collected object class Form/Folder entries (from S620).

Examples of the process of FIG. 6 will now be described with respect to Table 3 (above).

Request 1 of Table 3

In S600 of FIG. 6 the encapsulated database 130 searches all locally stored object class data entries and returns a set of object class data entry with one or more data fields matching "John Smith". In S603, assume that at least one matching object class Data entry is found, and the process advances to S605. In S605, all object class Topic pointers for the at least one matching object class Data entry are decoded. Then, in S610, the encapsulated database 130 analyzes the object class Topic entries pointed to by the decoded object class Data pointers. In S615, assume that included among the object class Topic entries pointed to by the decoded object class Topic pointers are "First Name" and "Last Name" object class Topic entries. Thus, S615 advances to S620, and the object class Form/Folder entries pointed to by the Data object's Form/Folder entries.

Request 2 of Table 3

In S600 of FIG. 6 the encapsulated database 130 searches all locally stored object class data entries and returns a set of object class data entry with one or more data fields matching "Smith" or "Jones". In S603, assume that at least one matching object class Data entry is found, and the process advances to S605. In S605, all object class Topic pointers for the at least one matching object class Data entry are decoded. Then, in S610, the encapsulated database 130 analyzes the object class Topic entries pointed to by the decoded Data object class Topic pointers. In S615, assume that included among the object class Topic entries pointed to by the decoded Data object class Topic pointers are "First Name" or "Last Name" object class Topic entries. Thus, S615 advances to S620, and the encapsulated database collects the object class Form/ Folder entries pointed to by the Data object's class Topic entries.

Figure 7:
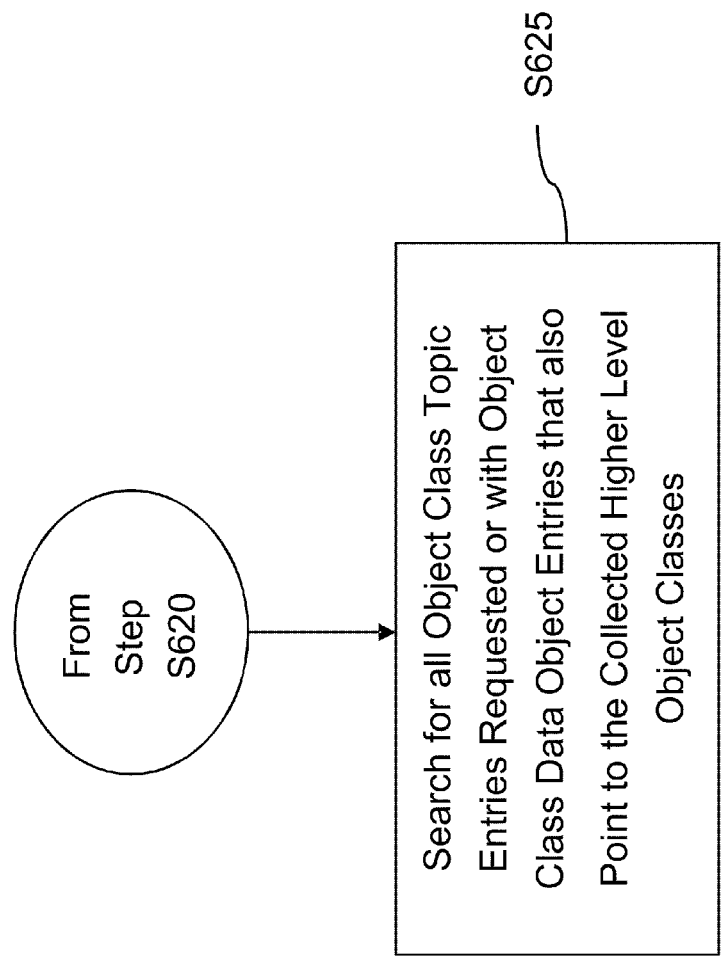
FIG. 7 illustrates an additional step of the process of FIG. 6 for performing a LIST command according to another example embodiment.

Next, because Request 2 is a "LIST" command, an additional step is performed after S620 of FIG. 6 before returning to S515 of FIG. 5. FIG. 7 illustrates the additional step of the process of FIG. 6 for the LIST command according to another example embodiment herein.

In S625 of FIG. 7, the encapsulated database 130 searches for and collects all data objects that point to the "First Name", "Last Name" and "Phone Number" object class topic entries that also point to the object class Form and Folder entries collected in S620 of FIG. 6. Then, after collecting the request object class topic entries requested for listing, the process advances to S515 of FIG. 5 and sends, to the requesting communication entity, the following: the matching object class Data entries (from S600), the matching object class Topic entries (from S615), the collected object class Form and Folder entries (from S620 of FIG. 6).

Request 3 of Table 3

Request 3 of Table 3 is similar to Request 2 of Table 3, except that the object class Topic entry requested for listing is "Instant Message History". Accordingly, the execution of Request 3 of Table 3 is similar to the description above related to Request 2 of Table 3, except that instead of collecting "First Name", "Last Name" and "Phone Number" object class topic entries in S625 of FIG. 7, all "Instant Message" object class data entries pointing to the object class Form/Folder entries collected in S620 of FIG. 6 are collected.

It will be readily appreciated by one of ordinary skill in the art that numerous other types of query commands may be executed at the encapsulated database 130 during the process of FIGS. 6 and 7 other than "LIST", and as such a further description of such commands has been omitted for the sake of brevity.

Information Sharing between Different Encapsulated Databases

Example embodiments have been above-described as performed at a single encapsulated database (i.e., the encapsulated database 130). However, as shown in the system 100 of FIG. 1, numerous encapsulated databases 130/135 may be deployed. In another example embodiment, each of the encapsulated databases 130/135 may be configured to have the same object class Topic entries. The object class topic entries are maintained uniform, or at least compatible, at each of the encapsulated databases 130/135 and across the system 100 such that pairing of Data Object Topic Object class entries, may be used to more easily obtain desired information from disparate databases. It will be appreciated that the remaining object classes Folder, Form and Data and standard record structures are more company-specific, user-specific and case-specific, respectively, and as such may vary within an encapsulated database (because dissimilar usage) and from database to database (encapsulated or non-encapsulated).

For example, by defining "Instant Message" to be an object class Topic entry for all encapsulated databases 130/135 within the system 100, a query for Instant Messages for a given user may be greatly simplified. One of ordinary skill in the art will appreciate that, if a database were not configured to include a Data Object-Topic Object pairing as per encapsulation methods, it would become much more difficult for a database, or user, requesting information, to successfully obtain such information across different databases. For example, a query for Instant Message information without a Topic-Data object class pairing as per the encapsulation methodologies described herein may be much more generic, allowing users to search multiple record or form structures without having knowledge of a particular form or record structure.

The encapsulated databases 130/135 may communicate with each other using the same communication interface protocol (CIP). As one of ordinary skill in the art will appreciate, databases using different internal database protocols (e.g., Oracle, etc.) may communicate and share information with each other if the same CIP is used for external communications (e.g., with connected encapsulated databases). Accordingly, each of the encapsulated databases 130/135 may be configured to use the same CIP.

For example, the CIP may include an information request format (e.g., described above with respect to S500 of FIG. 5) and/or an information storage request (e.g., described above with respect to S200 of FIG. 2). Thus, by standardizing the CIP across all encapsulated databases, costly and relatively inefficient database format translation software need not be developed or implemented.

Encapsulated Database Mediation of User Messaging

Figure 8:
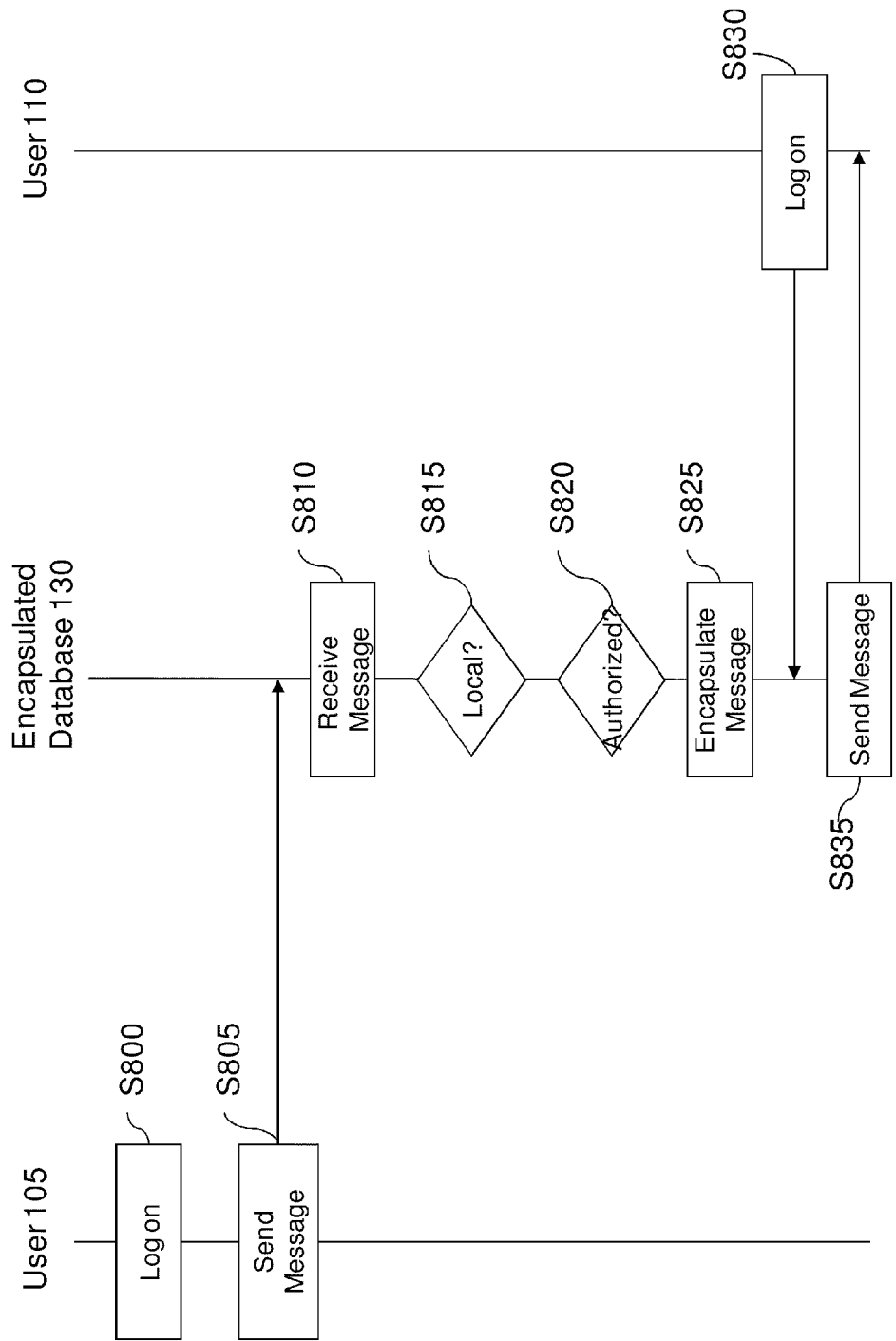
FIG. 8 illustrates an instant message process mediated by an encapsulated database according to an example embodiment.

Examples of user messaging mediated by the encapsulated databases 130 and 135 within the system 100 of FIG. 1 will now be described with respect to FIGS. 8 and 9. FIG. 8 illustrates an instant message process mediated by the encapsulated database 130 according to an example embodiment. In S800 of FIG. 8, the user 105 "logs onto" the encapsulated database 130. For example, the user 105 logs onto the encapsulated database 130 by authenticating itself (e.g., S300 of FIG. 3). In the example process of FIG. 8, it may be assumed that the user 105 has a pre-existing account which is maintained by the encapsulated database 130, and that the user 105 wishes to send an instant message to the user 110.

Accordingly, in S805 of FIG. 8, the user 105 configures an instant message in accordance with the common CIP (discussed above) for the encapsulated database 130, and sends the configured instant message to the encapsulated database 130. The encapsulated database receives the configured instant message in step S810. S810 is similar to S200 of FIG. 2 because instant messaging mediated by encapsulated databases is, essentially, storing and disseminating information at one or more encapsulated database, with access to the stored information being limited to an intended recipient of the instant message.

In S815, the encapsulated database 130 determines whether the intended recipient (i.e., user 110) of the received configured instant message has an account maintained locally at the encapsulated database 130. If the user 110 is determined to have a locally maintained account, the process advances to S820. The process of mediating instant messages between different encapsulated databases is discussed in greater detail later with respect to FIG. 9.

At S820 of FIG. 8, the encapsulated database 130 performs S205 of FIG. 2, which is described in greater detail within the process of FIG. 3. At S820, because the user 105 is already logged on (see S800), the authentication at S300 need not be performed. Thus, the encapsulated database 130 ensures that the user 105 has sufficient privileges to send an instant message to the user 110 (e.g., see S305 of FIG. 3). It will be assumed for the sake of description that the user 105 has sufficient privileges, and as such the process advances to S825.

At S825 of FIG. 8 the encapsulated database 130 encapsulates the instant message and stores the instant message in appropriate object class Folder/Form/Topic/Data entries for the user 110. The encapsulation at S825 has already been described above with respect to S210 of FIG. 2 and the process outlined in FIG. 4, and as such will not be described further for the sake of brevity.

At S830 of FIG. 8 the user 110 logs onto the encapsulated database 130 in the same manner as described above with respect to S800. The encapsulated database 130 treats the logging on at S830 as an implicit request to receive any new instant messages sent to the user 110 since the user 110 had last logged onto the encapsulated database 130. Accordingly, in S835 the encapsulated database 130 extracts the instant message and sends the instant message to the user 110. Encapsulated information extraction has been described above with respect to FIGS. 5 through 7 and will not be described further for the sake of brevity.

Also, while FIG. 8 illustrates an example where the user 110 logs onto the encapsulated database after the instant message is sent, in another example embodiment, the user 110 may already be logged onto the encapsulated database 130 when the user 105 sends the message (at step S805). In this example, S835 is performed after the encapsulation at S825 without first requiring the logging on at S830.

User Messaging between Users Logged onto Different Encapsulated Databases

Figure 9:
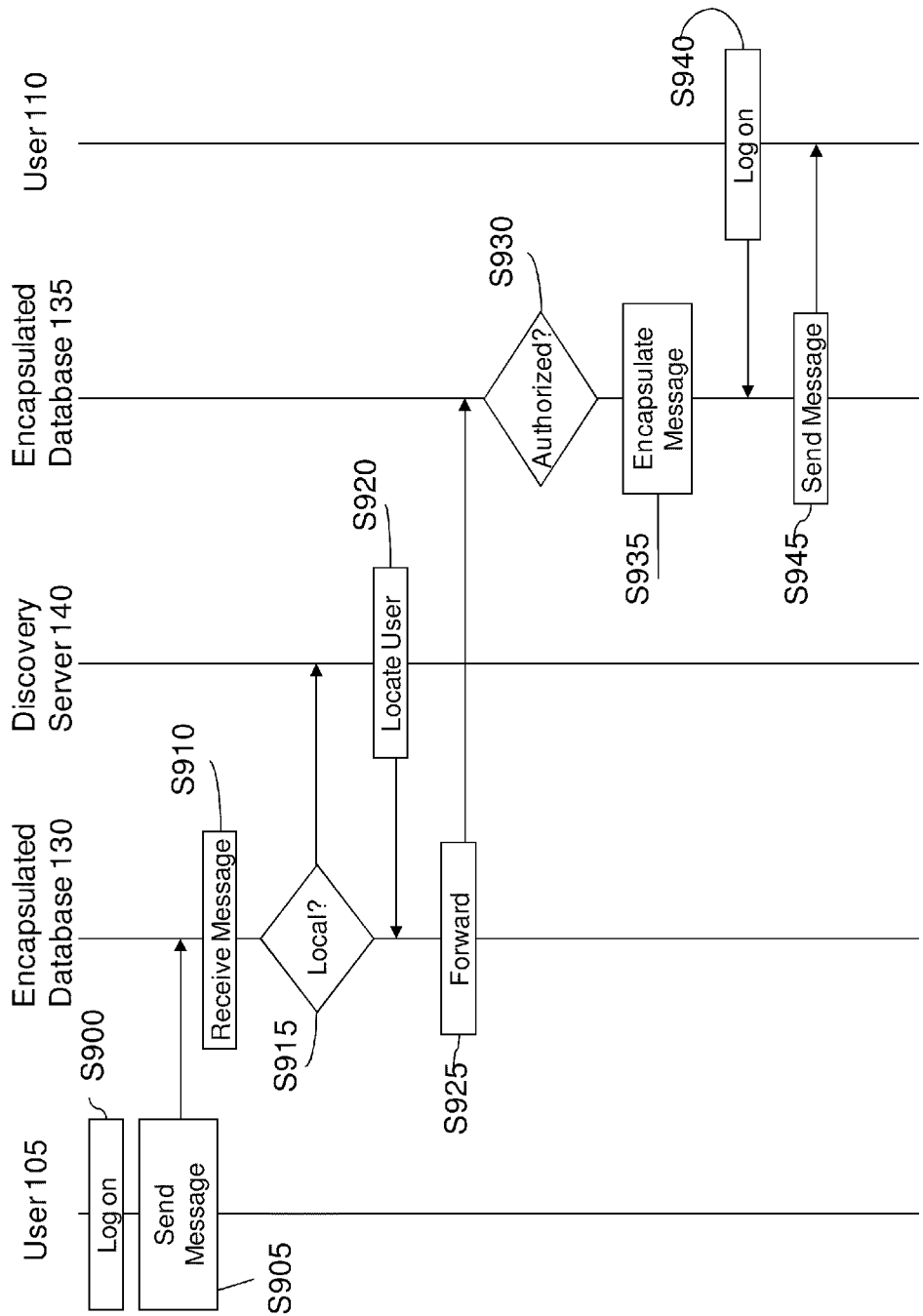
FIG. 9 illustrates an instant message process mediated by first and second encapsulated databases and a discovery server according to another example embodiment.

FIG. 9 illustrates an instant message process mediated by the encapsulated databases 130 and 135 and the discovery server 140 according to another example embodiment herein. Functions S900 through S910 are performed in the same manner as described above with respect to S800 through S810 of FIG. 8, and will not be described further for the sake of brevity. At S915 the encapsulated database 130 determines whether the intended recipient (i.e., user 110) of the received configured instant message has an account maintained locally at the encapsulated database 130. Unlike S815 of FIG. 8, S915 of FIG. 9 determines that the user 110 does not have an account maintained locally at the encapsulated database 130, and the encapsulated database 130 requests an identification of the encapsulated database to which the user 110 is assigned from the discovery server 140.

The discovery server 140 maintains a list of user assignments to encapsulated databases throughout the system 100. For example, when a user logs onto, or has an account maintained by, one or more of the encapsulated databases 130/135 within the system 100 of FIG. 1, the one or more encapsulated databases 130/135 reports the user location information to the discovery server 140 and the discovery server 140 adds the reported information to the list of user assignments stored therein.

Accordingly, at S920 of FIG. 9 the discovery server 140 receives the request for a location of the user 110, searches the list of user assignments stored therein and reports the location of the user 110 to the encapsulated database 130. Within the description of the example embodiment of FIG. 9, it will be assumed that the location reported by the discovery server 140 in S920 is the encapsulated database 140. Accordingly, in S925 of FIG. 9 the encapsulated database 130 forwards the instant message (sent by the user 105 in S905) to the encapsulated database 135.

At S930 of FIG. 9 the encapsulated database 135 receives the forwarded instant message and performs S205 of FIG. 2, which is described in greater detail within the process of FIG. 3. In S930, because the user 105 is already logged (S900), the authentication at S300 of FIG. 3 need not be performed. Thus, at S930 the encapsulated database 135 verifies that the user 105 has sufficient privileges to send an instant message to the user 110 (e.g., see S305 and S310 of FIG. 3). It will be assumed for the sake of description that the user 105 has sufficient privileges, and as such the process advances to S935.

In S935 of FIG. 9 the encapsulated database 135 encapsulates the received, forwarded instant message and stores the instant message in appropriate object class Folder/Form/Topic/Data entries for the user 110. The encapsulating at S935 has already been described above with respect to S210 of FIG. 2, the process of FIG. 4, and S825 of FIG. 8, and as such will not be described further for the sake of brevity.

In S940 of FIG. 9 the user 110 logs onto the encapsulated database 135 in the same manner as described above with respect to S800 and S830 of FIG. 8 and S900 of FIG. 9. The encapsulated database 130 treats the logging on at S940 as an implicit request to receive any new instant messages sent to the user 110 since the user 110 had last logged onto the encapsulated database 135. Accordingly, in S945, the encapsulated database 135 extracts the instant message and sends the instant message to the user 110. Encapsulated information extraction has been described above with respect to FIGS. 5 through 7 and will not be described further for the sake of brevity.

Also, while FIG. 9 illustrates an example where the user 110 logs onto the encapsulated database after the instant message is sent, in another example embodiment, the user 110 may already be logged onto the encapsulated database 135 when the encapsulated database 130 forwards the instant message (at S925). In this example, S945 is performed after the encapsulating at S935 without first requiring the logging on at S940.

Figure 10:
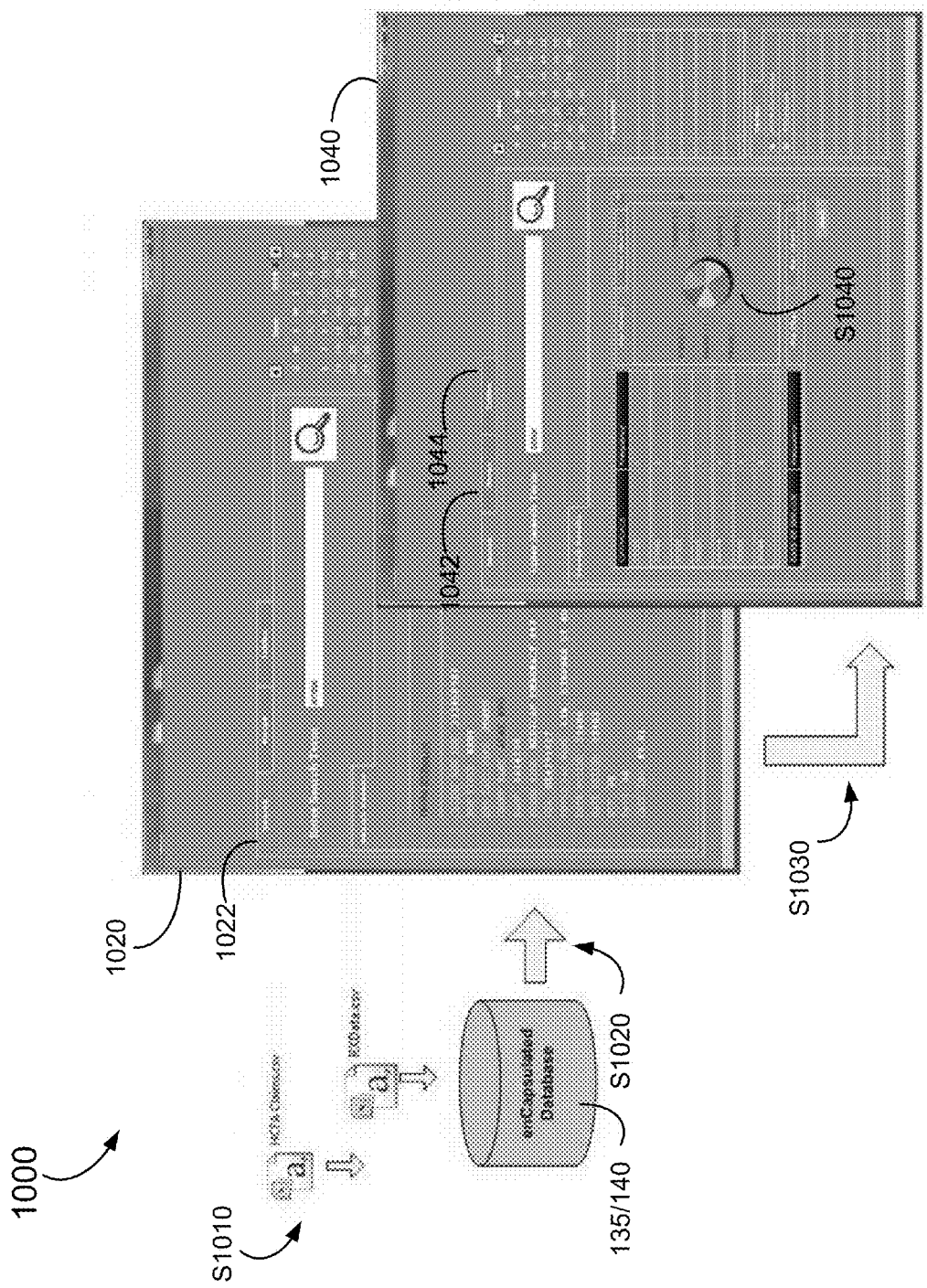
FIG. 10 is a screenshot to illustrate an example search procedure implemented by the example methodology in accordance with the example embodiments to determine types of medical procedures performed on patients based on information in two disparate data files.

FIG. 10 is a screenshot to illustrate an example search procedure implemented by the example methodology in accordance with the example embodiments to determine types of medical procedures performed on patients based on information in two disparate data files. FIG. 10 is provided to show one example application using the method of encapsulation and/or encapsulated database features in accordance with the example embodiments. The screenshot view 1000 of FIG. 10 is designed to illustrate an example way in which medical records from a plurality of disparate databases can be organized through use of the encapsulation methodology and/or encapsulated database described hereinabove to retrieve common information there from.

In FIG. 10, a company, "Acme", desired to know what types of procedures were performed on their company's employees (patients) based on information from two disparate data files. In other words, the medical records of these employees come from two different databases that, while they might have at least some basic or common patient information, have completely different database structures. Without encapsulation, the information above might take days if not weeks of man hours to perform a manual search or to create independent search routines that conform to each database structure.

At S1010, two CSV files containing prescription and claims information of Acme employees from the different databases are uploaded into the encapsulated databases 135/140 to encapsulate the data (S1020). For example, the S1020 functions may include partitioning each medical record into a plurality of data fields within the encapsulated databases 135/140, generating the pointers and random numbers as previously described with regard to FIG. 4, and then storing the data fields in non-adjacent storage locations within the encapsulated databases 135/140.

The upper screenshot view 1020 illustrates some of the data for a given employee medical record after encapsulation, displayed after a user enters a search term "acme" on a search tab 1022. As shown, view 1020 illustrates some of the store data fields of the data that was encapsulated from the two disparate data files. For example, in a medical record 1030 of a given employee (Mary Jones), date fields encapsulated from the RXData.csv file includes the group name (ACME MFG.), and various fields of personal data associated with the patient/employee. Record 1030 is just one of many records encapsulated in encapsulated database 135 or 140. Accordingly, the upper screenshot view represents a search for any records in the encapsulated database 135/140 with references to the Acme Company.

The lower screenshot view 1040 represents a results shot of the screen after the search has been completed and an Online Analytical Processing (OLAP) aggregation method (S1030) has been applied to the search result set. Of course, other aggregation methods such as summary (average, mean, variance, etc.), or graph structures like linear or bar charts can be applied to the search results to show how information varies within the encapsulated databases without having to know the structure of either. The encapsulation process allows a user or viewer to analyze two or more databases without having to do a one to one map of the databases field structures; a procedure called data mapping.

Tab 1042 represents areas for the search of specific tables entered into the encapsulated database 135 and/or 140. Since each encapsulated table retains an identity within an encapsulated database 135 and/or 140, each can be searched independently within the database 135 and/or 140. A search of two or more of these tables represents a merge (Tab 1042) of the selected tables.

For instance in the case of S35/40 with many encapsulated tables a user might want to search for data across a smaller number of encapsulated tables or within a specific table. Accordingly, tab 1042 represents the capabilities described above to get to a desired result (such as S1040) across a specific subset of tables.

Tab 1044 provides a list of the encapsulated tables and an area where they can be imported by dragging an external file from the desktop to an encapsulated database 135 and/or 140, or where a file can be imported to an encapsulated database 135 and/or 140 by selecting it from a list of files on a CPU, a computer system or network, for example.

Additional Security Features of the Encapsulated Database

As will now be described, the "encapsulated" database structure discussed above provides a level of "passive security", which protects data from malicious attacks by hackers. As discussed in the Background of the Invention section, conventional record storage typically stores all user-fields (e.g., First Name, Last Name, Data, etc.) in contiguous, memory addresses within a database.

In contrast, the encapsulated database 130/135 according to example embodiments described herein includes multiple hierarchical object classes, with lower-level object classes pointing to higher-level object classes without reciprocation. The different-level object classes are partitioned and stored together, such that information for a particular user is distributed throughout the encapsulated database 130/135.

Encapsulation does not constitute encryption; it is a passive type of security based on the way information (such as a message) is partitioned into object class fields for storage in corresponding tables which correspond to the specified object class. In order to "unlock" or "make relevant" the data stored in an encapsulated database 130/135, a hacker must obtain object class entries in each object class of the object class hierarchy. The different object classes among the object class hierarchy are "linked" by pointers which are encoded with a pointer key algorithm only accessible at the encapsulated database 130/135. Thus, it will be appreciated that if, for example, a hacker simply stole all the hard drives from the encapsulated database 130/135, the hacker would not be able to understand the information stored therein without the pointer key algorithm.

Further, it is understood that levels of encryption or security can be further employed within the encapsulated database 130/135, if desired. For example, the encapsulated database 130/135 may be encrypted with any well-known encryption protocol. In another example, the pointers stored in the lower-level object classes can be further encrypted to provide additional protection. Such encryption techniques are well-known in the art and will not be discussed further for the sake of brevity.

The example embodiments being thus described, it will be obvious that the same may be varied in many ways. For example, while above-described with respect to two (2) encapsulated databases 130/135 within the system 100, it is understood that other example embodiments of the present invention may scale to any number of encapsulated databases. Likewise, other example embodiments may be directed to different numbers or types of object classes, and not merely the four (4) object classes Folder, Form, Topic and Data. Such variations are not to be regarded as departure from the example embodiments, and all such modifications as would be obvious to one skilled in the art are intended to be included herein.

What is claimed is:

1. A method of encapsulating information in a database, comprising:

partitioning a message into a plurality of object class entries within the database, each of the plurality of object class entries constituting a portion of an object class from a plurality of object classes having a given hierarchy within the database;

generating a object class pointer for each of a first subset of the plurality of object class entries, the first subset including at least two object class entries therein, each generated pointer pointing to a different one of the plurality of object class entries, wherein generating the pointers further includes executing a pointer key algorithm, the algorithm additionally generating a random number for each object class entry without employing a hard encryption algorithm or an encryption key and concatenating the randomly generated numbers to form a single parameter string adapted to obfuscate a path between a pointer and its corresponding object class entry; and storing the plurality of object class entries in non-adjacent storage locations within the database, with each of a second subset of the plurality of object class entries stored in association with one of the generated pointers, the second subset being different from the first subset and including at least two object class entries therein.

2. The method of claim 1, wherein the plurality of object class entries are stored so that each pointer points to a higher-level object class entry, as determined by the object class hierarchy, than the object class entry stored in association with each respective pointer.

3. The method of claim 1, wherein said partitioning further includes separating the message into a plurality of hierarchical object class entries in object classes related to an organization source of the message, a sender of the message, a type of message sent, and content within the message.

4. The method of claim 3, wherein the hierarchical order of object class from highest to lowest is further defined as organization, sender, type of message and content, and object class entries stored in the sender, type of message and content object classes include the generated pointers which point to corresponding next-higher object classes organization, sender and type of message.

5. The method of claim 1, further comprising receiving an information storage request from a communication entity in a communication system requesting to either store the message in a given storage location within the database, or to retrieve a stored message from the database.

6. The method of claim 5, further comprising authorizing the communication entity and information storage request prior to commencing the partitioning of the message within the database or prior to commencing a retrieval of a stored message.

7. The method of claim 6, wherein authorizing includes:
authenticating the communication entity, and
determining whether the communication entity has required privileges to store information in the requested storage location or extract information from a given storage location, else
ignoring the information storage request if the communication entity is not authorized or does not have the required privileges.

8. The method of claim 1, wherein there are N object class entries and N-1 pointers.

9. The method of claim 1, wherein a given pointer only points in the direction of one or more higher-level object class entries than the given object class entry stored in association with the given pointer within the database.

10. The method of claim 1, wherein paths between pointers and their corresponding object class entries are protected from attack without hard encryption.

11. The method of claim 1, wherein the first subset includes each of the plurality of object class entries except a lowest-level object class entry, as determined by the object class hierarchy.

12. The method of claim 1, wherein the second subset includes each of the plurality of object class entries except a highest-level object class entry, as determined by the object class hierarchy.

13. The method of claim 1, further comprising configuring the stored plurality of object class entries as encapsulated data of an extractable or exportable file.

14. The method of claim 1, wherein the stored plurality of object class entries is merged data of two or more disparate databases, the merged data configurable into an extractable or exportable file.

15. The method of claim 1, wherein
the stored plurality of object class entries are further defined as a merged data set adapted to be filtered based on at least one of a common word, phrase and term, the method further comprising:
searching for data in fields common to all databases,
aligning data in successive rows by all common fields,
saving results from the searching and aligning functions as a new external file of encapsulated data.

16. An encapsulated database for use in a communication system, comprising:
a plurality of object class entries corresponding to given fields in a received message received from a given communication entity in the system, the message having been partitioned so that fields are dedicated to corresponding object class entries, each object class entry constituting a portion of a given object class of a plurality of object classes having a given object class hierarchy;
a plurality of pointers, each for pointing to a different one of a first subset of the object class entries, the first subset including at least two object class entries therein, each pointer generated by a pointer key algorithm which additionally generates a random number for each object class entry without employing a hard encryption algorithm or an encryption key and concatenates the randomly generated numbers to form a single parameter string adapted to obfuscate a path between a given pointer and its corresponding object class entry; and
a plurality of storage locations, in which each of the plurality of object class entries corresponding to the fields of the message are stored in non-adjacent storage locations, with each of a second subset of the object class entries stored in association with one of the plurality of pointers such that each pointer points to a higher-level object class entry, as determined by the object class hierarchy, than the object class entry stored in association with each respective pointer, wherein the second subset is different than the first subset and includes at least two object class entries therein.

17. The database of claim 16, wherein
the message is separated into a plurality of hierarchical object class entries of object classes related to an organization source of the message, a sender of the message, a type of message sent, and content within the message, and
the order from highest to lowest is organization, sender, type of message and content.

18. The database of claim 16, wherein
the stored plurality of object class entries are further defined as a merged data set adapted to be filtered based on at least one of a common word, phrase and term, the method further comprising:
searching for data in fields common to all databases,
aligning data in successive rows by all common fields,
saving results from the searching and aligning functions as a new external file of encapsulated data.

19. A communication system, comprising:
a plurality of users,
a plurality of encapsulated databases, each encapsulated database configured as recited in claim 16,
a discovery server to maintain encapsulated database associations for all users logged onto one of the encapsulated databases,
each of the users, encapsulated databases and discovery server being connected or accessible to each other via the internet, and
each of the encapsulated databases using the same communication interface protocol for at least external communication so as to communicate and share information with each other.

20. The communication system of claim 19, wherein each of the plurality of encapsulated databases include a first object class related to content and a second object class identifying a type of content, the first object class being a lower level object class as compared to the second object class and pointing to the second object class, the types of content identified by the second object class being the same at each of the plurality of encapsulated databases.

21. A method of organizing medical records from a plurality of disparate databases to retrieve common information there from, comprising:
partitioning each medical record into a plurality of data fields within a central database, each of the plurality of data fields constituting a portion of an data field class from a plurality of data field classes having a given hierarchy within the central database;
generating a pointer for each of a first subset of the plurality of data fields, the first subset including at least two data fields therein, each generated pointer pointing to a different one of the plurality of data fields, wherein generating the pointers further includes executing a pointer key algorithm, the algorithm additionally generating a random number for each data field without employing a hard encryption algorithm or an encryption key and concatenating the randomly generated numbers to form a single parameter string adapted to obfuscate a path between a pointer and its corresponding data field; and
storing the plurality of data fields in non-adjacent storage locations within the central database, with each of a second subset of the data fields stored in association with one of the generated pointers, the second subset being different from the first subset and including at least two data fields therein.

22. The method of claim 21, wherein the plurality of data fields are stored so that each pointer points to a higher-level data field, as determined by the hierarchy, than the data field stored in association with each respective pointer.

23. The method of claim 21, wherein the stored plurality of plurality of data fields are represented as merged data configurable into an extractable or exportable file.

24. The method of claim 21, wherein
the stored plurality of data fields are further defined as a merged data set adapted to be filtered based on at least one of a common word, phrase and term, the method further comprising:
searching for data in fields common to all databases,
aligning data in successive rows by all common fields,
saving results from the searching and aligning functions as a new external file of encapsulated data.

25. The method of claim 21, further comprising configuring the stored plurality of data fields as encapsulated data of an extractable or exportable file.

26. A method of encapsulating information over a mobile communication device, comprising:
partitioning a message received by the device into a plurality of object class entries within a database, each of the plurality of object class entries constituting a portion of an object class from a plurality of object classes having a given hierarchy within the database;
generating a object class pointer for each of a first subset of the plurality of object class entries, the first subset including at least two object class entries therein, each generated pointer pointing to a different one of the plurality of object class entries, wherein generating the pointers further includes executing a pointer key algorithm, the algorithm additionally generating a random number for each object class entry without employing a hard encryption algorithm or an encryption key and concatenating the randomly generated numbers to form a single parameter string adapted to obfuscate a path between a pointer and its corresponding object class entry; and
storing the plurality of object class entries in non-adjacent storage locations within one of the database and device, with each of a second subset of the plurality of object class entries stored in association with one of the generated pointers, the second subset being different from the first subset and including at least two object class entries therein.

27. The method of claim 26, wherein the device is selected from a group comprising at least one of a personal digital assistant, laptop, cell phone, tablet personal computer, RFID device, laser-based communication device, LED-based communication device, mobile navigation system, mobile entertainment system, mobile information system, mobile writing system and text messaging system.

28. The method of claim 26, wherein the database is part of the device.

29. The method of claim 26, wherein the database is connected to the device.

30. The method of claim 26, wherein the database is stored on but not connectively integrated with the device.

31. The method of claim 26, wherein the database is generated or hosted by the device.

32. The method of claim 26, wherein the database is adapted to be at least one of transmitted, transferred, transformed or translated by the device.

\* \* \* \* \*